United States Patent
Li et al.

(10) Patent No.: US 10,313,906 B2
(45) Date of Patent: Jun. 4, 2019

(54) METHOD AND DEVICE FOR SENDING INFORMATION

(71) Applicant: Huawei Technologies Co., Ltd., Shenzhen (CN)

(72) Inventors: Bo Li, Xi'an (CN); Qiao Qu, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 15/151,307

(22) Filed: May 10, 2016

(65) Prior Publication Data

US 2016/0255530 A1    Sep. 1, 2016

Related U.S. Application Data (63) Continuation of application No. PCT/CN2013/086833, filed on Nov. 11, 2013.

(51) Int. Cl.
*H04W 74/08* (2009.01)
*H04W 72/02* (2009.01)
(Continued)

(52) U.S. Cl.
CPC ....... *H04W 24/10* (2013.01); *H04W 72/1231* (2013.01); *H04W 74/0808* (2013.01); *H04W 84/12* (2013.01)

(58) Field of Classification Search
CPC ......... H04W 72/1231; H04W 74/0808; H04W 74/0816; H04W 74/0825
See application file for complete search history.

(56) References Cited

U.S. PATENT DOCUMENTS

2004/0233876 A1* 11/2004 Nakashima ............... H04L 1/18
370/338
2008/0232339 A1* 9/2008 Yang ................ H04W 72/1215
370/342
(Continued)

FOREIGN PATENT DOCUMENTS

CN    101815302 A    8/2010
CN    103299698 A    9/2013
(Continued)

OTHER PUBLICATIONS

KR 10-2012-0136557 (priority document corresponding to US 2014/0146764), filed Nov. 28, 2012.*
(Continued)

*Primary Examiner* — Scott M Sciacca
(74) *Attorney, Agent, or Firm* — Leydig, Voit & Mayer, Ltd.

(57) ABSTRACT

Provided are a method and device for sending information. The method for sending information of the present invention comprises: before a sending station sends data, detecting a busy or idle condition of a channel; if the channel is in an idle state, increasing, by the sending station, the maximum time length for occupying the channel, and sending data, wherein the time length for occupying the channel when the data is sent is less than or equal to the increased maximum time length; and if the channel is in a busy state, reducing, by the sending station, the maximum time length for occupying the channel, and sending data, wherein the time length for occupying the channel when the data is sent is less than or equal to the reduced maximum time length.

15 Claims, 8 Drawing Sheets

(51) Int. Cl.
*H04W 84/12* (2009.01)
*H04W 24/10* (2009.01)
*H04W 72/12* (2009.01)

(56) References Cited

U.S. PATENT DOCUMENTS

| | | | | |
|---|---|---|---|---|
| 2010/0008226 A1* | 1/2010 | Kang | H04W 4/00 | 370/235 |
| 2010/0034091 A1* | 2/2010 | Hiertz | H04L 47/10 | 370/236 |
| 2010/0182929 A1* | 7/2010 | Abraham | H04L 45/20 | 370/252 |
| 2012/0182886 A1* | 7/2012 | Ong | H04W 74/0816 | 370/252 |
| 2012/0207036 A1* | 8/2012 | Ong | H04W 74/0816 | 370/252 |
| 2014/0078970 A1* | 3/2014 | Guo | H04W 72/005 | 370/329 |
| 2014/0087748 A1* | 3/2014 | Hong | H04W 72/1215 | 455/452.1 |
| 2014/0146764 A1* | 5/2014 | Kim | H04W 74/006 | 370/329 |
| 2014/0293868 A1* | 10/2014 | Levanen | H04L 1/1607 | 370/328 |
| 2015/0016268 A1* | 1/2015 | Merlin | H04W 28/0268 | 370/236 |
| 2015/0236822 A1* | 8/2015 | Pirskanen | H04L 1/1812 | 370/329 |
| 2016/0100230 A1* | 4/2016 | Ma | H04N 21/44209 | 725/109 |

FOREIGN PATENT DOCUMENTS

| | | | | |
|---|---|---|---|---|
| CN | 103379381 A | | 10/2013 | |
| GB | 2510139 A | * | 7/2014 | ........... H04L 1/1812 |
| WO | 2013165553 A1 | | 11/2013 | |

OTHER PUBLICATIONS

"IEEE Standard for Information technology—Telecommunications and information exchange between systems—Local and Metropolitan area networks—Specific requirements—Part 11: Wireless LAN Medium Access Control (MAC) and Physical Layer (PHY) Specifications," IEEE Std 802.11-2012, pp. 0-2695, Institute of Electrical and Electronics Engineers, New York, New York (Mar. 29, 2012).

"IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control(MAC) Quality of Service Enhancements" IEEE Std 802.11e-2005, pp. i-189, Institute of Electrical and Electronics Engineers, New York, New York (Nov. 11, 2005).

"IEEE Standard for Information technology—Telecommunications and information exchange between systems Local and metropolitan area networks—Specific requirements, Part 11: Wireless LAN Medium Access Control (MAC) and Physical Layer (PHY) Specifications" IEEE Std 802.11-2012, pp. i-2695, Institute of Electrical and Electronics Engineers, New York, New York (Mar. 29, 2012).

\* cited by examiner

METHOD AND DEVICE FOR SENDING INFORMATION

CROSS-REFERENCE TO RELATED APPLICATIONS

This application is a continuation of International Patent Application No. PCT/CN2013/086833, filed on Nov. 11, 2013, which is hereby incorporated by reference in its entirety.

TECHNICAL FIELD

The present disclosure relates to the field of communication technology, in particular, to a method and a device for sending information.

BACKGROUND

A wireless local area network (abbreviated as WLAN) system operates at an unlicensed spectrum, and the unlicensed spectrum belong to public spectrums. Thus, a transmitting station needs to compete for a channel before sending data.

In conventional technology, the transmitting station needs to detect a busy/free state of the channel during competing for the channel. After waiting until the channel is free for a period of time, the transmitting station may reserve the channel and send data through the reserved channel, or directly send the data without reserving the channel. In conventional technology, a maximum duration of occupancy of the channel is a fixed value no matter whether the channel is busy or not. The duration that the transmitting station reserves the channel each time can not exceed the maximum duration. In a case that the channel is free, if the transmitting station needs to send too many data, the transmitting station can not send all the data through the channel reserved this time even though the duration of reservation of the channel is equal to the maximum duration. Thus, the transmitting station needs to compete for the channel more than once, which increases the complexity for sending data by the transmitting station. While, in a case that the channel is busy, if the transmitting station only needs to send a few data and still reserves the channel for the maximum duration, reserved channel resources will be wasted, thus the utilization of channel resources is not high.

SUMMARY

A method and a device for sending information are provided according to embodiments of the invention, to improve the utilization of a channel.

In a first aspect, a method for sending information is provided according to an embodiment of the invention, which includes:

detecting, by a transmitting station, a busy/free state of a channel before sending data;

increasing, by the transmitting station, a maximum duration of occupancy of the channel and sending, by the transmitting station, data, in a case that the channel is in a free state, where a duration of occupancy of the channel for sending the data is shorter than or equal to the increased adjusted maximum duration; and reducing, by the transmitting station, the maximum duration of occupancy of the channel and sending, by the transmitting station, the data, in a case that the channel is in a busy state, where the duration of occupancy of the channel for sending the data is shorter than or equal to the reduced adjusted maximum duration.

In a first possible implementation of the first aspect based on the first aspect, the detecting, by the transmitting station, the busy/free state of the channel includes:

detecting, by the transmitting station, whether the channel is continuously free within a predetermined duration;

determining, by the transmitting station, the channel is in a free state in a case that the channel is continuously free within the predetermined duration; and determining, by the transmitting station, the channel is in a busy state in a case that the channel is not continuously free within the predetermined duration.

In a second possible implementation of the first aspect based on the first aspect, the detecting, by the transmitting station, the busy/free state of the channel includes:

detecting, by the transmitting station, whether the channel is continuously free within a predetermined duration and whether the channel is continuously free in a back-off process;

determining, by the transmitting station, the channel is in a free state in a case that the channel is continuously free within the predetermined duration and the channel is continuously free in the back-off process; and determining, by the transmitting station, the channel is in a busy state in a case that the channel is not continuously free within the predetermined duration or the channel is not continuously free in the back-off process.

In a third possible implementation of the first aspect based on the first aspect and any one of the first and the second possible implementation of the first aspect, the reducing, by the transmitting station, the maximum duration of occupancy of the channel includes:

reducing, by the transmitting station, the maximum duration of occupancy of the channel based on an interference parameter of the busy state of the channel, where the interference parameter includes at least one of the following parameters:

an interference duration, the number of times of interference, an interference frequency and an interference source type.

In a fourth possible implementation of the first aspect based on the first aspect and any one of the first to the third possible implementation of the first aspect, the increased adjusted maximum duration is shorter than or equal to a first predetermined duration, and/or the reduced adjusted maximum duration is longer than or equal to a second predetermined duration, where the first predetermined duration is longer than the second predetermined duration.

In a fifth possible implementation of the first aspect based on the first aspect and any one of the first to the fourth possible implementation of the first implementation, the sending, by the transmitting station, the data includes:

reserving, by the transmitting station, the channel and sending, by the transmitting station, the data through the reserved channel, where a duration of reservation of the channel is shorter than or equal to the adjusted maximum duration.

In a second aspect, a transmitting station is provided according to an embodiment of the invention, which includes:

a detecting module, configured to detect a busy/free state of a channel before sending data; and an adjusting and sending module, configured to:
increase a maximum duration of occupancy of the channel and send the data in a case that the detecting module detects that the channel is in a free state, where a duration of occupancy of the channel for sending the data is shorter than or equal to the increased adjusted maximum duration, and
reduce the maximum duration of occupancy of the channel and send the data in a case that the detecting module detects that the channel is in a busy state, where the duration of occupancy of the channel for sending the data is shorter than or equal to the reduced adjusted maximum duration.

In a first possible implementation of the second aspect based on the second aspect, the detecting module is configured to:
detect whether the channel is continuously free within a predetermined duration;
determine the channel is in a free state in a case that the channel is continuously free within the predetermined duration; and
determine the channel is in a busy state in a case that the channel is not continuously free within the predetermined duration.

In a second implementation of the second aspect based on the second aspect, the detecting module is further configured to:
detect whether the channel is continuously free within a predetermined duration and whether the channel is continuously free in a back-off process;
determine the channel is in a free state in a case that the channel is continuously free within the predetermined duration and the channel is continuously free in the back-off process; and
determine the channel is in a busy state in a case that the channel is not continuously free within the predetermined duration or the channel is not continuously free in the back-off process.

In a third possible implementation of the second aspect based on the second aspect and any one of the first and the second possible implementation of the second aspect, in a case that the detecting module detects that the channel is in a busy state, the adjusting and sending module is configured to: reduce the maximum duration of occupancy of the channel based on an interference parameter of the busy state of the channel,
where the interference parameter includes at least one of the following parameters:
an interference duration, the number of times of interference, an interference frequency and an interference source type.

In a fourth possible implementation of the second aspect based on the second aspect and any one of the first to the third possible implementation of the second aspect, the increased adjusted maximum duration is shorter than or equal to a first predetermined duration, and/or
the reduced adjusted maximum duration is longer than or equal to a second predetermined duration,
where the first predetermined duration is longer than the second predetermined duration.

In a fifth possible implementation of the second aspect based on the second aspect and any one of the first to the fourth possible implementation of the second aspect, the adjusting and sending module is configured to: reserve the channel and send the data through the reserved channel, where a duration of reservation of the channel is shorter than or equal to the adjusted maximum duration.

According to the present disclosure, the transmitting station detects the busy/free state of the channel before sending data, adjusts the maximum duration of occupancy of the channel based on the busy/free state of the channel and sends the data, where the duration of occupancy of the channel for sending the data is shorter than or equal to the adjusted maximum duration, thereby achieving dynamically adjusting the maximum duration of occupancy of the channel based on the busy/free state of the channel, thus improving the utilization of the channel with consideration to fairness.

BRIEF DESCRIPTION OF THE DRAWINGS

The drawings to be used in the descriptions of embodiments or conventional technology are described briefly as follows, so that technical solutions according to the embodiments of the invention or according to conventional technology may become clearer. Apparently, the drawings in the following descriptions only illustrate some embodiments of the invention. For those in the art, other drawings may be obtained based on these drawings without any creative work.

DETAILED DESCRIPTION OF THE EMBODIMENTS

To make the objective, technical solutions and advantages of the embodiments of the invention clearer, technical solutions according to the embodiments of the invention are described clearly and completely hereinafter in conjunction with the drawings. Apparently, the described embodiments are only a part rather than all of the embodiments of the invention. Any other embodiments obtained by those skilled in the art based on the embodiments according to present disclosure without any creative work fall in the scope of invention.

Figure 1:
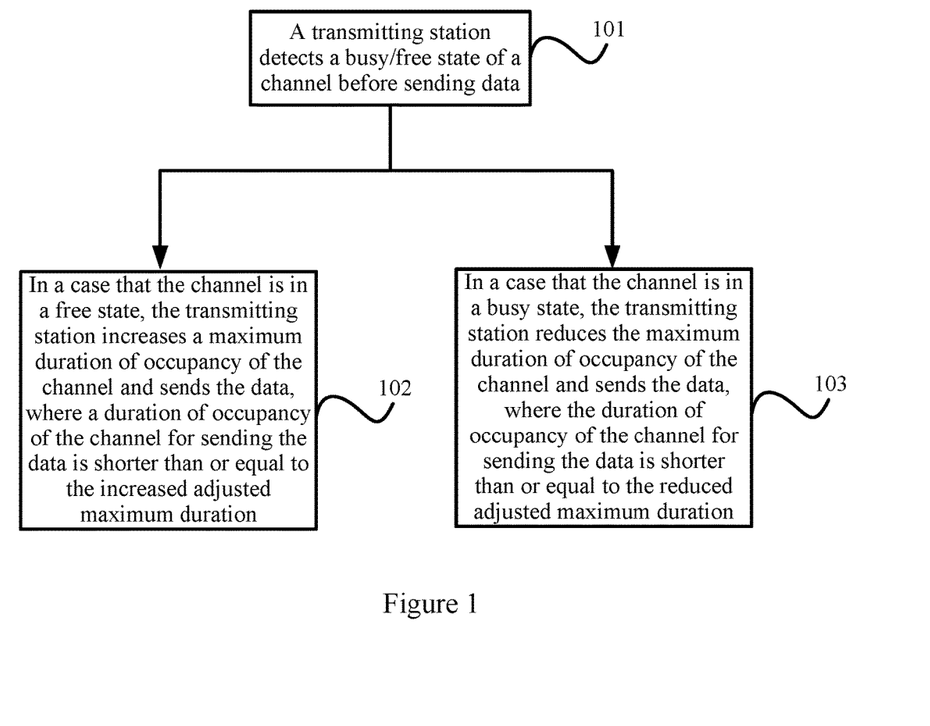
FIG. 1 is a flow chart of a method for sending information according to a first embodiment of the invention.

FIG. 1 is a flow chart of a method for sending information according to a first embodiment of the invention, and as illustrated in FIG. 1, the method according to the embodiment may include the following steps.

In step 101, a transmitting station detects a busy/free state of a channel before sending data.

WLAN systems share channel resources in a manner of random competition, and different WLAN systems, such as a next-generation WLAN system and a Legacy WLAN system, may coexist in a manner of random competition. A technology which can achieve the coexistence of a next-generation WLAN system and another system (such as a next-generation WALN system, a Legacy WLAN system and a non-WALN system) is introduced according to the embodiment, and the principle thereof may apply to other freely-competing systems.

Before sending the data, i.e., before accessing the channel, the transmitting station needs to compete for the channel first and detect the busy/free state of the channel during competing for the channel, i.e., determining whether there is an interference signal within a time period of competing for the channel. It is determined the channel is in a busy state in a case that there is an interference signal within the time period of competing for the channel, and it is determined the channel is in a free state in a case that there is no interference signal within the time period of competing for the channel. The interference signal may be a signal from another communication system or a signal from a non-communication system, such as a signal from a microwave oven.

In the embodiment, there are at least two detecting methods, depending on data sent by the transmitting station. Specifically, in a case that the transmitting station sends a data frame with a high priority without requiring a back-off process, a first detecting method can be used accordingly, which includes: determining whether the channel is continuously free within a predetermined duration $T_{free}$ within the time period of competing for the channel, i.e., determining whether the channel remains continuously free within the initial $T_{free}$ of the time period of competing for the channel. The predetermined duration may be a predetermined duration at the beginning of a first detection and the duration may be equal to the length of the distributed coordination function interframe space (abbreviated as DIFS) in IEEE802.11 standard or may be set according to practical conditions. A second detecting method may include determining whether the channel is continuously free within $T_{free}$ within the time period of competing for the channel and whether the channel is continuously free in a back-off process, i.e., determining whether the channel remains continuously free within the initial $T_{free}$ of the time period of competing for the channel and whether the channel remains continuously free in the back-off process. In the second detecting method, a random back-off process is added after the channel remains free for $T_{free}$ within the time period of competing and before the channel is reserved for sending the data or the data is directly sent without reserving the channel, thereby reducing a possibility of a collision caused by multiple stations which access the channel simultaneously. In the embodiment, other detecting method may be used, which is not limited in the present disclosure. Afterwards, step 102 is performed in a case that the transmitting station detects that the channel is in a free state, or step 103 is performed in a case that the transmitting station detects that the channel is in a busy state.

In step 102, in a case that the channel is in a free state, the transmitting station increases a maximum duration of occupancy of the channel and sends the data, where a duration of occupancy of the channel for sending the data is shorter than or equal to the increased adjusted maximum duration.

In the embodiment, it is determined whether the channel is in a free state based on the detection result of the busy/free state of the channel. For the first detecting method above, in a case that the transmitting station detects that the channel remains continuously free within the initial $T_{free}$ of the time period of competing for the channel, i.e., the transmitting station receiving no interference signal within the time period of competing for the channel, i.e., no other station sending data and no non-WLAN signal being transmitted through the channel, the transmitting station determines that the channel is in a free state. For the second detecting method above, in a case that the transmitting station detects that the channel remains continuously free within the initial $T_{free}$ of the time period of competing for the channel and the channel remains continuously free in the back-off process (i.e., the channel remains continuously free till a back-off counter counts backward to zero during back-off counting for the first time), i.e., the transmitting station receiving no interference signal within the time period of competing for the channel, i.e., no other station sending data and no non-WLAN signal being transmitted through the channel in the process that the transmitting station waits until the channel is continuously free for $T_{free}$ for the first time and a back-off counter counts backward to zero, the transmitting station determines that the channel is in a free state.

In order to fully utilize the channel, the transmitting station increases the maximum duration of occupancy of the channel. That is, the transmitting station adds a duration to the last maximum duration of occupancy of the channel. The maximum duration of occupancy of the channel is a maximum duration that a system allows each transmitting station to occupy the channel to send data each time, i.e., a maximum duration of occupancy of the channel for sending data for a single time. Specially, in a case that a next-generation WLAN system accesses the channel for the first time, a default initial maximum duration of occupancy of the channel may be $T_{initial}$, which may be set according to an empirical value or according to a standard or regulation. Furthermore, the transmitting station sends data, and a duration of occupancy of the channel for sending the data is shorter than or equal to the increased adjusted maximum duration. That is, the transmitting station sends the data through the channel according to the increased adjusted maximum duration of occupancy of the channel. The transmitter station may, for example, directly send data frames. Or the sending station may reserve the channel first according to the increased adjusted maximum duration of occupancy of the channel through, for example, interaction of request to send/clear to send (abbreviated as RTS/CTS) frames, and send the data after the channel is successfully reserved. That is, the transmitting station reserves the channel and sends the data through the reserved channel. The duration of reservation of the channel is shorter than or equal to the adjusted maximum duration.

For example, the maximum duration of occupancy of the channel is specified to be 3 ms. In a case that it takes 7 ms for a transmitting station to send all data, according to the conventional technology for sending information, the transmitting station needs to compete to reserve the channel for 3 ms to transmit a part of the data and compete twice more to transmit the rest of the data. According to the technical solution of the present disclosure, in a case that the channel is free, the transmitting station competes to reserve the channel for 3 ms to transmit a part of the data, and compete once more to reserve the channel for 4 ms (the maximum duration of occupancy of the channel is increased to 4 ms) to transmit the rest of the data, thereby reducing the number of times of the competition and improving the utilization of the channel.

In step 103, in a case that the channel is in a busy state, the transmitting station reduces the maximum duration of occupancy of the channel and sends the data, where the duration of occupancy of the channel for sending the data is shorter than or equal to the reduced adjusted maximum duration.

In the embodiment, it is determined whether the channel is in a busy state based on the detection result of the busy/free state of the channel. For the first detecting method above, in a case that the transmitting station detects that the channel is not continuously free within the initial $T_{free}$ of the time period of competing for the channel, i.e., the transmitting station receiving an interference signal within the time period of competing for the channel, i.e., another station sending data or another signal being transmitted through the channel, the transmitting station determines that the channel is in a busy state. The transmitting station may wait at least twice for the channel to be free for a duration, and the channel remains continuously free for $T_{free}$ in the last wait. For the second detecting method above, in a case that the transmitting station detects that the channel is not continuously free within the initial $T_{free}$ of the time period of competing for the channel or the channel is not continuously free in the back-off process, i.e., the transmitting station receiving an interference signal within the time period of competing for the channel, i.e., another station sending data or another signal being transmitted through the channel in the process that the transmitting station waits until the channel is continuously free for $T_{free}$ for the first time or the back-off counter counts backward to zero, the transmitting station determines that the channel is in a busy state. In a case that the channel turns to be busy while the back-off counter has not counted backwards to zero, the transmitting station needs to execute the back-off process again after waiting until the channel is continuously free for $T_{free}$.

For the second detecting method above, the transmitting station determining the channel is in a busy state may include: first, the transmitting station goes through at least two back-off counting processes after waiting until the channel remains continuously free for $T_{free}$ for the first time, where the back-off counter counts to zero in the last back-off process; second, the transmitting station waits at least twice for the channel to be free for a duration, where the channel remains continuously free for $T_{free}$ in the last wait and afterward the back-off counter counts to zero in a first back-off process; or, third, the transmitting station waits at least twice for the channel to be free for a duration, where the channel remains continuously free for $T_{free}$ in the last wait and afterwards the transmitting station goes through at least two back-off counting processes, where the back-off counter counts to zero in the last back-off counting process.

Furthermore, it is to avoid the problem of a waste of channel resources caused by that another transmitting station can not reserve and use the channel in a case that the present transmitting station still reserve the channel according to the maximum duration, i.e., the duration of reservation of the channel being less than or equal to the maximum duration, even though the transmitting station only needs to send a few data. For this purpose, the transmitting station reduces the maximum duration of occupancy of the channel, i.e., the transmitting station reduces a duration from the last duration of occupancy of the channel. Specially, in a case that a next-generation WLAN system accesses the channel for the first time, a default initial maximum duration of occupancy of the channel may be $T_{initial}$. Furthermore, the transmitting station sends the data, and a duration of occupancy of the channel for sending the data is shorter than or equal to the reduced adjusted maximum duration. That is, the transmitting station sends the data through the channel according to the reduced adjusted maximum duration of occupancy of the channel. The transmitting station, for example, may directly send data frames. Or the transmitting station may reserve the channel first according to the reduced adjusted maximum duration of occupancy of the channel (for example, through interaction of RTS/CTS frames), and send the data after the channel is successfully reserved. That is, the transmitting station reserves the channel and sends the data through the reserved channel. The duration of reservation of the channel is shorter than or equal to the adjusted maximum duration.

Furthermore, it is assumed that a maximum duration that the transmitting station occupies the channel for the ith time is $T_i$ and a maximum duration of occupancy of the channel for the i+1th time is $T_{i+1}$. In the embodiment, how to increase or reduce the maximum duration of occupancy of the channel is not limited. Optionally, the maximum duration may be increased or reduced exponentially, linearly or a combination thereof. In a case that the maximum duration of occupancy of the channel is increased or reduced exponentially, it is provided that $T_{i+1}=T_i*K$, where K>1 indicates increasing and K<1 indicates reducing. In a case that the maximum duration of occupancy of the channel is increased or reduced linearly, it is provided that $T_{i+1}=T_i+\Delta T$, where $\Delta T>0$ indicates increasing and $\Delta T<0$ indicates reducing.

Furthermore, the increased adjusted maximum duration is shorter than or equal to a first predetermined duration, and/or the reduced adjusted maximum duration is longer than or equal to a second predetermined duration, where the first predetermined duration is longer than the second predetermined duration.

In practical operations, to avoid the problem that utilization of the channel and the fairness are not high caused by that a transmitting station occupies the channel for too much time to affect accessing of another system or station, a limit is usually applied to the increased maximum duration of occupancy of the channel. In the embodiment, the increased maximum duration is provided to be shorter than or equal to the first predetermined duration $T_{max}$. On the other hand, to avoid the problem that an efficiency of the system is too low caused by that the maximum duration of occupancy of the channel is too short in a scenario with severe interferences, a limit is applied to the reduced maximum duration. In the embodiment, the reduced adjusted maximum duration is provided to be longer than or equal to the second predetermined duration $T_{min}$, where $T_{max}$ and $T_{min}$ may be specified according to a standard or regulation and $T_{max}>T_{min}$. $T_{i+1}$, $T_i$, $T_{initial}$ are all longer than or equal to the second predetermined duration $T_{min}$ and shorter than or equal to the first predetermined duration $T_{max}$. In a case that the adjusted maximum duration $T_{i+1}>T_{max}$, let $T_{i+1}=T_{max}$, and in a case that the adjusted maximum duration $T_{i+1}<T_{min}$, let $T_{i+1}=T_{min}$.

According to the embodiment, when the transmitting station needs to send data, the transmitting station detects the busy/free state of the channel, adjusts the maximum duration of occupancy of the channel based on the busy/free state of the channel and sends the data, where the duration of occupancy of the channel for sending the data is shorter than or equal to the adjusted maximum duration, thereby achieving dynamically adjusting the maximum duration of occupancy of the channel based on the busy/free state of the channel, thus improving the utilization of the channel with consideration to fairness.

The technical solutions according to the embodiment illustrated in FIG. 1 are described in detail in conjunction with some particular embodiments.

Figure 2:
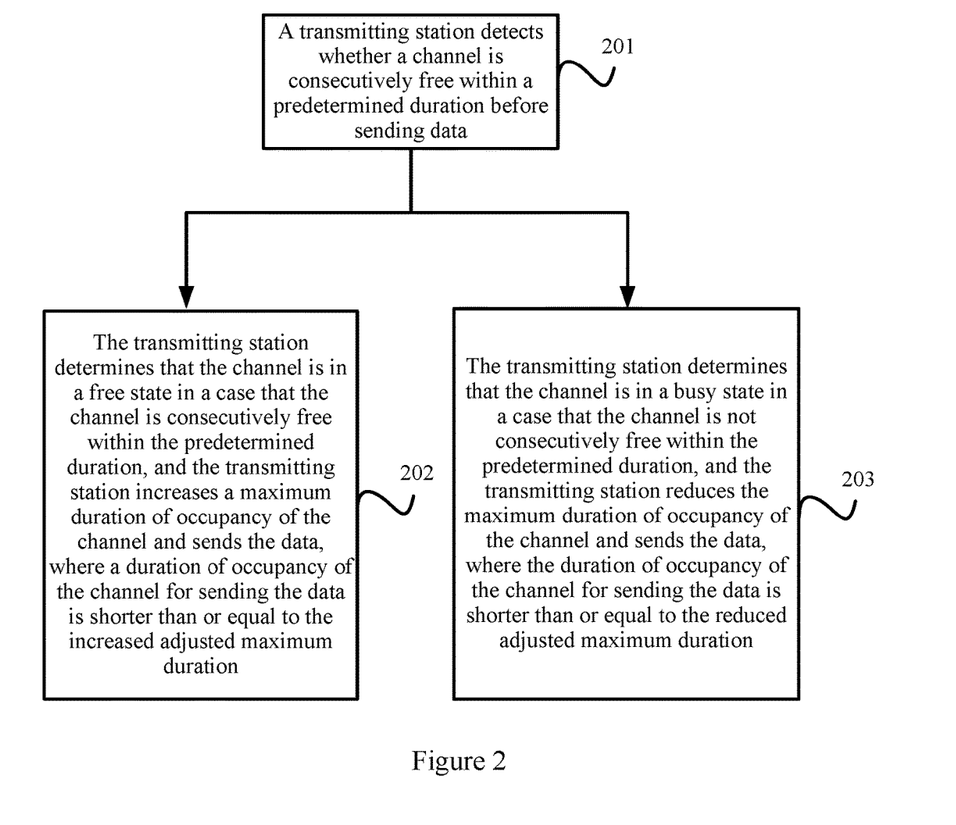
FIG. 2 is a flow chart of a method for sending information according to a second embodiment of the invention.

FIG. 2 is a flow chart of a method for sending information according to a second embodiment of the invention, and as illustrated in FIG. 2, the method according to the embodiment may include the following steps.

In step 201, a transmitting station detects whether a channel is continuously free within a predetermined duration before sending data.

In the embodiment, before sending data, the transmitting station waits until the channel remains continuously free for $T_{free}$ within a time period of competing for the channel. And then the transmitting station can directly send the data, or reserve the channel and send the data through the reserved channel without executing a back-off process. In the embodiment, the transmitting station determines whether the channel is busy or free by detecting whether the channel is continuously free within the predetermined duration. That is, the transmitting station determines whether the channel remains continuously free within an initial $T_{free}$ of the time period of competing for the channel, to determine whether the transmitting station receives an interference signal, i.e., whether the channel is free, within a time period of competing for the channel. Furthermore, step 202 is performed in a case that the transmitting station detects that the channel is in a free state, or step 203 is performed in a case that the transmitting station detects that the channel is in a busy state.

In step 202, the transmitting station determines that the channel is in a free state in a case that the channel is continuously free within the predetermined duration, and the transmitting station increases a maximum duration of occupancy of the channel and sends the data, where a duration of occupancy of the channel for sending the data is shorter than or equal to the increased adjusted maximum duration.

In the embodiment, in a case that the transmitting station detects that the channel remains continuously free within the initial $T_{free}$ of the time period of competing for the channel, i.e., the channel being continuously free for $T_{free}$ for the first time in a first wait within the time period of competing for the channel, i.e., the transmitting station receiving no interference signal within the time period of competing for the channel, the transmitting station determines that the channel is in a free state. Furthermore, the transmitting station increases the maximum duration of occupancy of the channel and sends the data through the channel according to the increased adjusted maximum duration of occupancy of the channel. That is, a duration of occupancy of the channel for sending the data is shorter than or equal to the increased adjusted maximum duration. Or the transmitting station reserves the channel according to the increased adjusted maximum duration of occupancy of the channel and sends the data after the channel is successfully reserved. That is, a duration of reservation of the channel is shorter than or equal to the increased adjusted maximum duration.

In step 203, the transmitting station determines that the channel is in a busy state in a case that the channel is not continuously free within the predetermined duration, and the transmitting station reduces the maximum duration of occupancy of the channel and sends the data, where the duration of occupancy of the channel for sending the data is shorter than or equal to the reduced adjusted maximum duration.

In the embodiment, in a case that the transmitting station detects that the channel does not remain continuously free within the initial $T_{free}$ of the time period of competing for the channel, i.e., the channel is not continuously free for $T_{free}$ in the first wait within the time period of competing for the channel, the transmitting station may wait at least twice for the channel to be free for a duration. The channel is continuously free for $T_{free}$ in the last wait. That is, the transmitting station receives an interference signal within the time period of competing for the channel, and the transmitting station determines that the channel is in a busy state. Furthermore, the transmitting station reduces the maximum duration of occupancy of the channel and sends the data through the channel according to the reduced adjusted maximum duration of occupancy of the channel. That is, the duration of occupancy of the channel for sending the data is shorter than or equal to the reduced adjusted maximum duration. Or the transmitting station may reserve the channel according to the reduced adjusted maximum duration of occupancy of the channel and send the data through the reserved channel. That is, the duration of reservation of the channel is shorter than equal to the reduced adjusted maximum duration.

Furthermore, the transmitting station reducing the maximum duration of occupancy of the channel may include: reducing, by the transmitting station, the maximum duration of occupancy of the channel based on an interference parameter of the busy state of the channel. The interference parameter may include at least one of the following parameters: an interference duration, the number of times of interference, an interference frequency and an interference source type.

In the embodiment, the transmitting station reduces the maximum duration of occupancy of the channel based on a parameter (at least one of an interference duration, the number of times of interference, an interference frequency and an interference source type) of a received interference signal when the channel is busy. The interference source type may include, but is not limited to, a next-generation WLAN system, a Legacy WLAN system and a non-WLAN system, and the interference parameter is not limited to the four parameters above.

In the embodiment, it is assumed that the number of the parameter is n, a maximum duration of occupancy of the channel by the transmitting station for the ith time is $T_i$ and a maximum duration of occupancy of the channel for the i+1th time is $T_{i+1}$. In a first possible implementation, it is provided that $T_{i+1}=F(T_i, x_1, \ldots, x_n)$, where F represents a function and independent variables $x_1, x_2 \ldots x_n$ represent respectfully parameters such as the duration, the number of times or the frequency of interference received in the time period of competing for the channel. In the embodiment there is no special requirement on the expression of $F(T_i, x_1, \ldots, x_n)$, but a generally recommended principle may be as follows: the longer the interference duration is, the more the number of times of the interference is or the higher the interference frequency is, the higher the rate and the amplitude for reducing the maximum duration of occupancy of the channel are. In a second possible implementation, the maximum duration of occupancy of the channel may be dynamically adjusted in different ways as the interference source type varies within the time period of competing, and it may be provided that $T_{i+1}=F_n(T_i)$, where $F_n$ represents a function corresponding to an nth interference source type. In a third possible implementation, it may be provided that $T_{i+1}=F_n(T_i, x_1, \ldots, x_n)$, where $F_n$ represents a function corresponding to an nth interference source type and independent variables $x_1, x_2 \ldots, x_n$ represent respectively parameters such as the duration, the number of times, the frequency of the interference received in the time period of competing for the channel. In the embodiment, there is no special requirement on the expression of $F_n$, but generally recommended principles include: 1) a fairness principle, which means that in a case that a channel reservation mechanism of a system of the interference source type is known, the expression should guarantee fairness with respect to the system of the interference source type. For example, in a case that the interference source type is a Legacy WLAN system, the system according to the embodiment of the invention may directly turn to be a system with a policy that the maximum duration of reservation of the channel is fixed as in the Legacy system; and 2) a rapid convergence principle, which means that durations of the channel reservation of multiple systems should rapidly converge to a steady state by adopting an appropriate policy.

According to the embodiment, when the transmitting station needs to send data, the transmitting station detects the busy/free state of the channel, adjusts the maximum duration of occupancy of the channel based on the busy/free state of the channel and sends the data, where the duration of occupancy of the channel for sending the data is shorter than or equal to the adjusted maximum duration. Furthermore, the maximum duration of occupancy of the channel can be reduced based on the interference parameter, thereby achieving dynamically adjusting the maximum duration of occupancy of the channel based on the busy/free state of the channel, thus improving the utilization of the channel with consideration to fairness.

Figure 3:
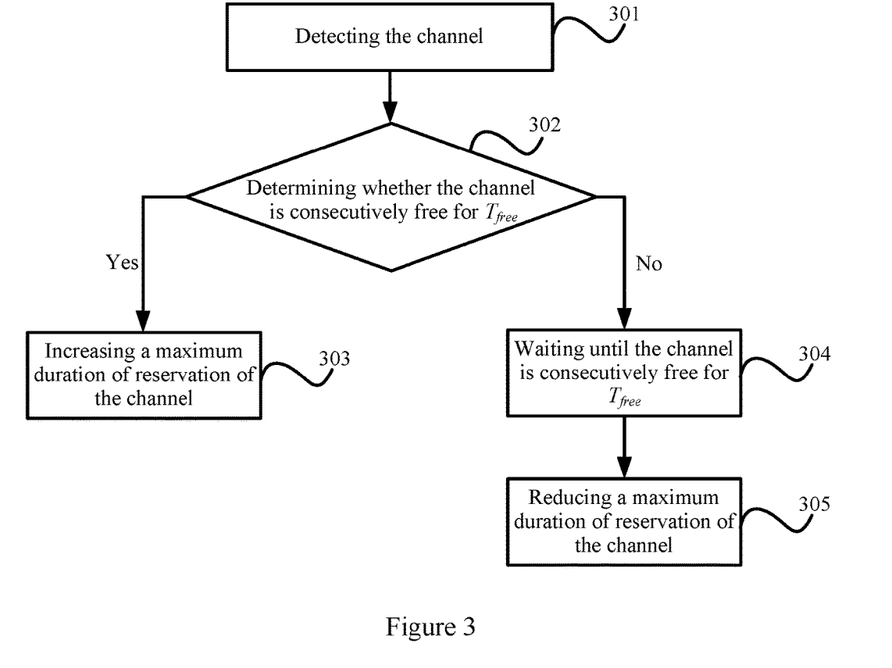
FIG. 3 is a flow chart of a method for sending information according to a third embodiment of the invention.
Figure 4:
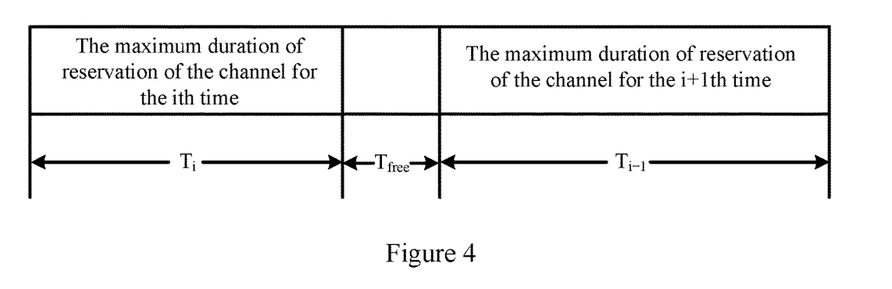
FIG. 4 is a first diagram of an access flow of the method for sending information according to the third embodiment of the invention.
Figure 5:
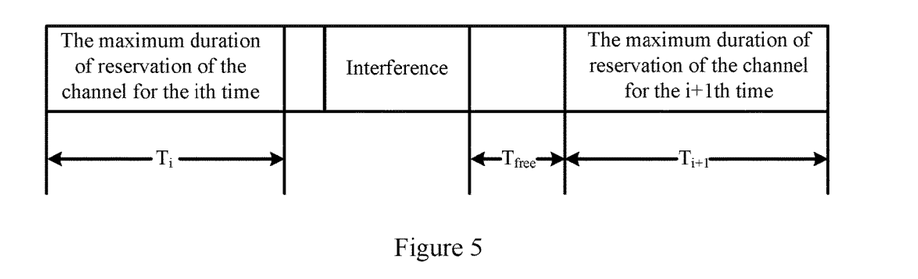
FIG. 5 is a second diagram of an access flow of the method for sending information according to the third embodiment of the invention.

FIG. 3 is a flow chart of a method for sending information according to a third embodiment of the invention. FIG. 4 is a first diagram of an access flow in the method for sending information according to the third embodiment of the invention and FIG. 5 is a second diagram of the access flow in the method for sending information according to the third embodiment of the invention.

In the embodiment, the transmitting station may reserve a channel and send data through the reserved channel, after waiting until the channel is continuously free for $T_{free}$ within a time period of competing for the channel. A maximum duration of reservation of the channel may be called a maximum reservation duration. In a case that a maximum duration of reservation of the channel by the transmitting station for the ith time is $T_i$, communication is terminated and the channel is released when the communication has lasted for $T_i$. In a case that the transmitting station has more data to send, reference is made to FIGS. 3, 4 and 5.

In step 301 the channel is detected.

In step 302 it is determined whether the channel is continuously free for $T_{free}$.

In combination with FIG. 4, step 303 is performed in a case that the channel remains free within the time period of $T_{free}$; in combination with FIG. 5, step 304 is performed in a case that the channel receives interference within the time period of $T_{free}$.

In step 303 a maximum duration of reservation of the channel is increased.

In the embodiment, the transmitting station reserves the channel for the i+1th time, and the maximum duration of reservation of the channel is increased to $T_{i+1}$, where $T_i \leq T_{i+1}$.

In step 304 it is to wait until the channel is continuously free for $T_{free}$.

In step 305 a maximum duration of reservation of the channel is reduced.

In the embodiment, the transmitting station reserves the channel for the i+1th time, and the maximum duration of reservation of the channel is reduced to $T_{i+1}$, where $T_i \geq T_{i+1}$.

Figure 6:
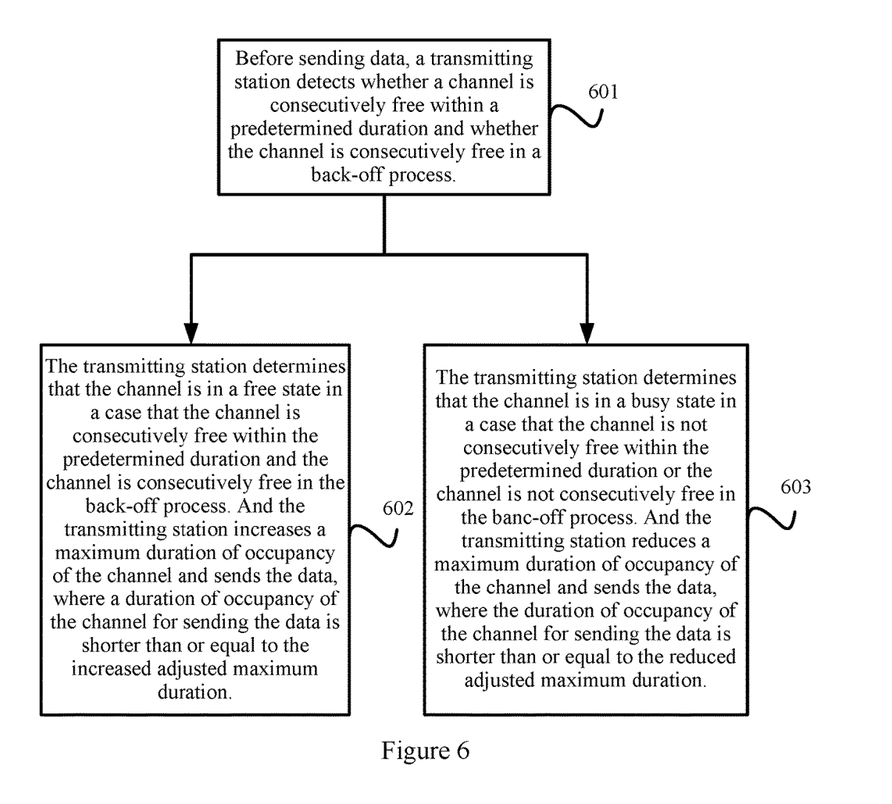
FIG. 6 is a flow chart of a method for sending information according to a fourth embodiment of the invention.

FIG. 6 is a flow chart of a method for sending information according to a fourth embodiment of the invention, and as illustrated in FIG. 6, the method according to the embodiment of the invention may include following steps.

In step 601, before sending data, a transmitting station detects whether a channel is continuously free within a predetermined duration and whether the channel is continuously free in a back-off process.

In the embodiment, a random back-off process is added after the channel remains free for $T_{free}$ within the time period of competing and before the channel is reserved for sending the data or the data is directly sent without reserving the channel, thereby reducing a possibility of a collision caused by multiple stations which access the channel simultaneously. The transmitting station determines whether the transmitting station receives an interference signal, i.e., whether the channel is free, within a time period of competing for the channel by detecting whether the channel is continuously free within an initial $T_{free}$ of the time period of competing for the channel and whether the channel is continuously free in the back-off process. Furthermore, step 602 is performed in a case that the transmitting station detects that the channel is in a free state; step 603 is performed in a case that the transmitting station detects that the channel is in a busy state.

In step 602, the transmitting station determines that the channel is in a free state in a case that the channel is continuously free within the predetermined duration and the channel is continuously free in the back-off process. And the transmitting station increases a maximum duration of occupancy of the channel and sends the data, where a duration of occupancy of the channel for sending the data is shorter than or equal to the increased adjusted maximum duration of occupancy of the channel.

In the embodiment, in a case that the transmitting station detects that the channel remains continuously free within $T_{free}$ and remains continuously free in the back-off process, i.e., the channel being continuously free for $T_{free}$ in a first wait of the transmitting station within the time period of competing for the channel and the channel being continuously free in the back-off process (i.e., the channel remaining continuously free till a back-off counter counts backward to zero during back-off counting for the first time), i.e., the transmitting station receiving no interference signal within the time period of competing for the channel, the transmitting station determines that the channel is in a free state. Furthermore, the transmitting station increases the maximum duration of occupancy of the channel and sends the data through the channel according to the increased adjusted maximum duration of occupancy of the channel. That is, a duration of occupancy of the channel for sending the data is shorter than or equal to the increased adjusted maximum duration. Or the transmitting station may reserve the channel according to the increased adjusted maximum duration of occupancy of the channel and send the data through the reserved channel. That is, a duration of reservation of the channel is shorter than or equal to the increased adjusted maximum duration.

In step 603, the transmitting station determines that the channel is in a busy state in a case that the channel is not continuously free within the predetermined duration or the channel is not continuously free in the banc-off process. And the transmitting station reduces a maximum duration of occupancy of the channel and sends the data, where the duration of occupancy of the channel for sending the data is shorter than or equal to the reduced adjusted maximum duration.

In the embodiment, in a case that the transmitting station detects that the channel does not remain continuously free within the predetermined duration or the channel does not remain continuously free in the back-off process, i.e., the transmitting station detecting that the channel is not continuously free for $T_{free}$ in the first wait within the time period of competing for the channel or the channel is not continuously free in the process that a back-off counter counts backwards to zero in the back-off process, i.e., the transmitting station receiving an interference signal within the time period of competing for the channel, the transmitting station determines that the channel is in a busy state. Furthermore, the transmitting station reduces the maximum duration of occupancy of the channel and sends the data through the channel according to the reduced adjusted maximum duration of occupancy of the channel. That is, the duration of occupancy of the channel for sending the data is shorter than or equal to the reduced adjusted maximum duration. Or the transmitting station may reserve the channel according to the reduced adjusted maximum duration of occupancy of the channel and send the data through the reserved channel. That is, the duration of reservation of the channel is shorter than or equal to the reduced adjusted maximum duration.

Furthermore, the transmitting station reducing the maximum duration of occupancy of the channel may include: reducing, by the transmitting station, the maximum duration of occupancy of the channel based on an interference parameter of the busy state of the channel. The interference parameter may include at least one of the following parameters: an interference duration, the number of times of interference, an interference frequency and an interference source type.

According to the embodiment, when the transmitting station needs to send data, the transmitting station detects the busy/free state of the channel, adjusts the maximum duration of occupancy of the channel based on the busy/free state of the channel and sends the data, where the duration of occupancy of the channel for sending the data is shorter than or equal to the adjusted maximum duration. Furthermore, the maximum duration of occupancy of the channel can be reduced based on the interference parameter, thereby achieving dynamically adjusting the maximum duration of occupancy of the channel based on the busy/free state of the channel, thus improving the utilization of the channel with consideration to fairness.

Figure 7:
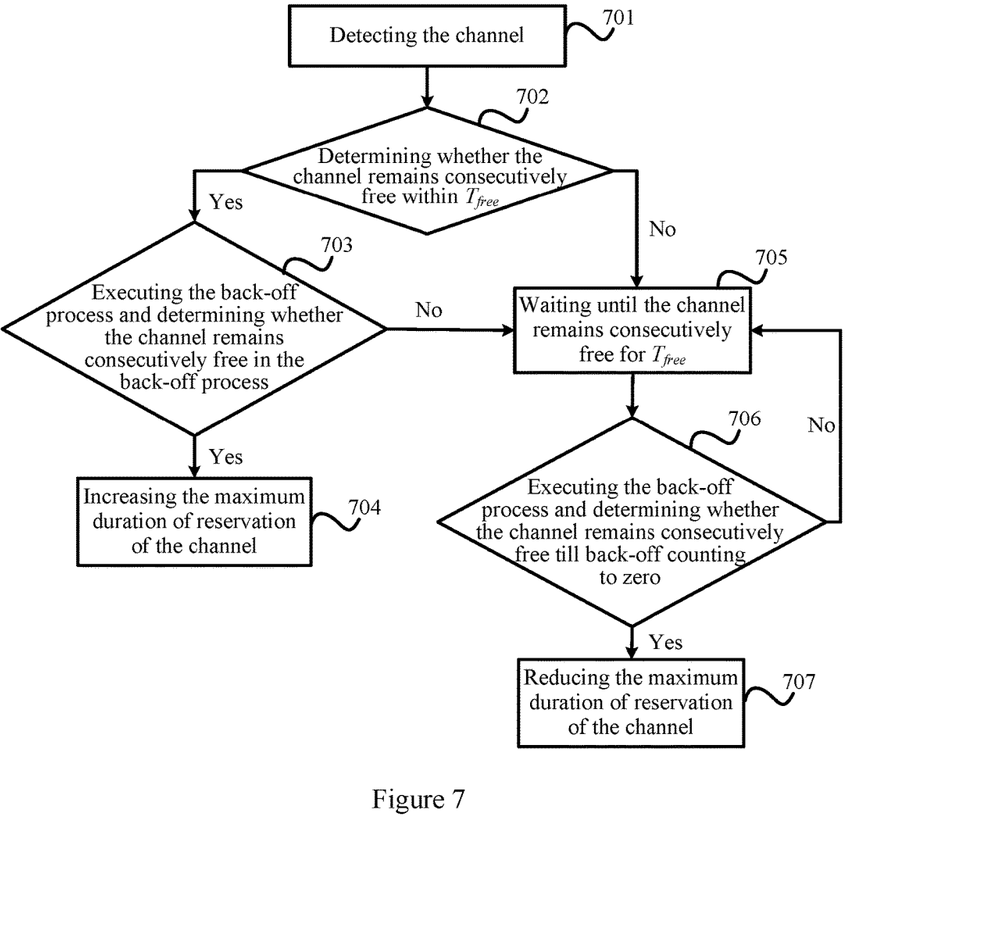
FIG. 7 is a flow chart of a method for sending information according to a fifth embodiment of the invention.
Figure 8:
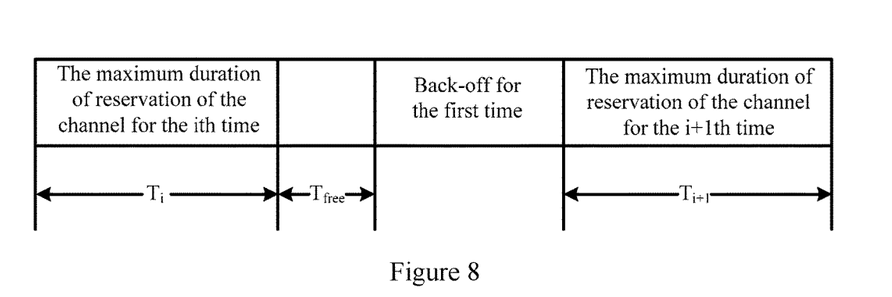
FIG. 8 is a first diagram of an access flow of the method for sending information according to the fifth embodiment of the invention.
Figure 9:
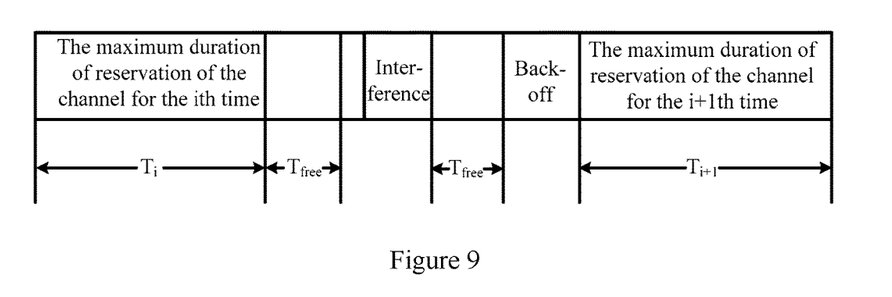
FIG. 9 is a second diagram of an access flow of the method for sending information according to the fifth embodiment of the invention.
Figure 10:
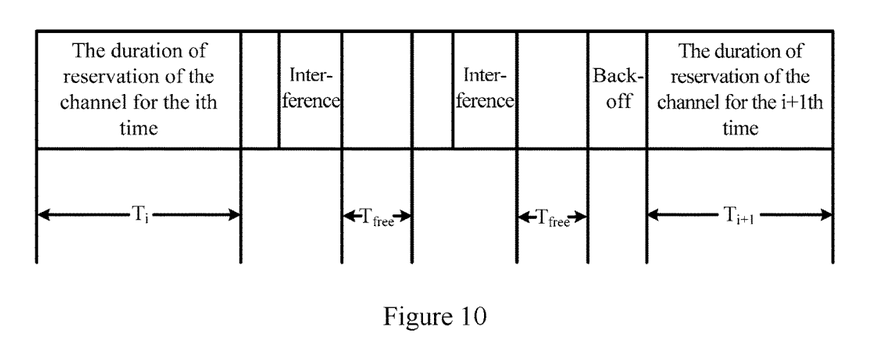
FIG. 10 is a third diagram of an access flow of the method for sending information according to the fifth embodiment of the invention.

FIG. 7 is a flow chart of a method for sending information according to a fifth embodiment of the invention. FIG. 8 is a first diagram of an access flow in the method for sending information according to the fifth embodiment of the invention. FIG. 9 is a second diagram of an access flow in the method for sending information according to the fifth embodiment of the invention. FIG. 10 is a third diagram of an access flow in the method for sending information according to the fifth embodiment of the invention.

In the embodiment, the transmitting station needs to execute a back-off process after waiting until a channel remains continuously free for $T_{free}$ within a time period of competing for the channel, to reserve the channel and send data through the reserved channel. A maximum duration of reservation of the channel may be called a maximum reservation duration in the embodiment. In a case that a maximum duration of reservation of the channel by the transmitting station for the ith time is $T_1$, communication is terminated and the channel is released when the communication has lasted for $T_i$. In a case that the transmitting station has more data to send, reference is made to FIGS. 7, 8, 9 and 10.

In step 701 the channel is detected.

In step 702 it is determined whether the channel remains continuously free within $T_{free}$.

In combination with FIG. 8, step 703 is performed in a case that the channel remains continuously free within $T_{free}$; in combination with FIG. 10, step 705 is performed in a case that the channel does not remain continuously free within $T_{free}$.

In step 703 the back-off process is executed and it is determined whether the channel remains continuously free in the back-off process.

In combination with FIG. 8, step 704 is performed in a case that the channel remains continuously free in the back-off process; in combination with FIG. 9, step 705 is performed in a case that the channel does not remain continuously free in the back-off process.

In step 704 the maximum duration of reservation of the channel is increased.

In the embodiment, the transmitting station reserves the channel for the i+1th time, and the maximum duration of reservation of the channel is increased to $T_{i+1}$, where $T_i \leq T_{i+1}$.

In step 705 it is to wait until the channel remains continuously free for $T_{free}$.

In step 706 the back-off process is executed and it is determined whether the channel remains continuously free till the back-off counter counts to zero.

Step 705 is performed in a case that the channel turns to be busy in the back-off process; step 707 is performed in a case that the channel remains free till the back-off counter counts to zero.

In step 707 the maximum duration of reservation of the channel is reduced.

In the embodiment, the transmitting station reserves the channel for the i+1th time, and the maximum duration of reservation of the channel is reduced to $T_{i+1}$, where $T_i \geq T_{i+1}$.

Figure 11:
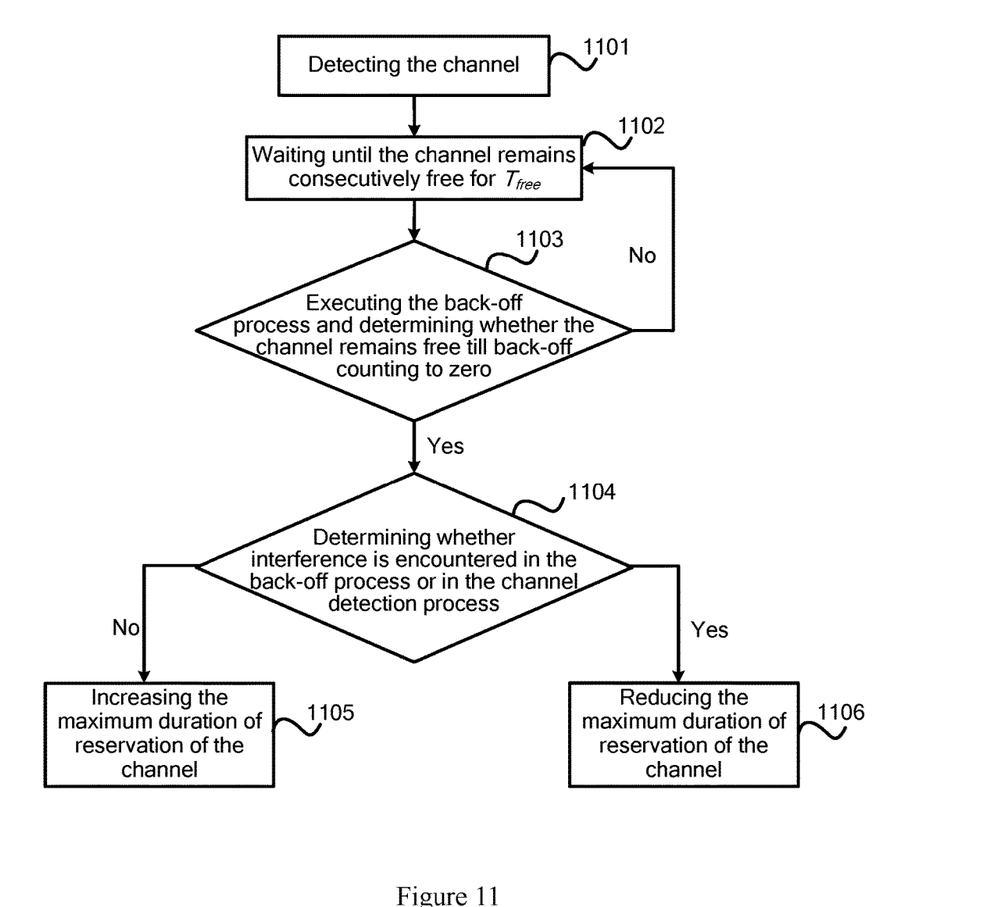
FIG. 11 is a flow chart of a method for sending information according to a sixth embodiment of the invention.

FIG. 11 is a flow chart of a method for sending information according to a sixth embodiment of the invention. In the embodiment, the transmitting station needs to execute a back-off process after waiting until a channel remains continuously free for $T_{free}$ within a time period of competing for the channel, to reserve the channel and send data through the reserved channel. A maximum duration of reservation of the channel may be called a maximum reservation duration in the embodiment. In a case that a maximum duration of reservation of the channel by the transmitting station for the ith time is $T_i$, communication is terminated and the channel is released when the communication has lasted for $T_i$. In a case that the transmitting station has more data to send, reference is made to FIG. 11.

In step 1101 the channel is detected.

In step 1102 it is to wait until the channel remains free for $T_{free}$.

In step 1103 the back-off process is executed and it is determined whether the channel remains continuously free till the back-off counter counts to zero.

Step 1102 is performed in a case that the channel turns to be busy in the back-off process; step 1104 is performed in a case that the channel remains free till the back-off counter counts to zero.

In step 1104 it is determined whether interference is encountered in the back-off process or in the channel detection process.

Step 1105 is performed in a case that no interference is encountered; step 1106 is performed in a case that interference is encountered.

In step 1105 the maximum duration of reservation of the channel is increased.

In the embodiment, the transmitting station reserves the channel for the i+1th time, and the maximum duration of reservation of the channel is increased to $T_{i+1}$, where $T_i \leq T_{i+1}$.

In step 1106 the maximum duration of reservation of the channel is reduced.

In the embodiment, the transmitting station reserves the channel for the i+1th time, and the maximum duration of reservation of the channel is reduced to $T_{i+1}$, where $T_i \geq T_{i+1}$.

Figure 12:
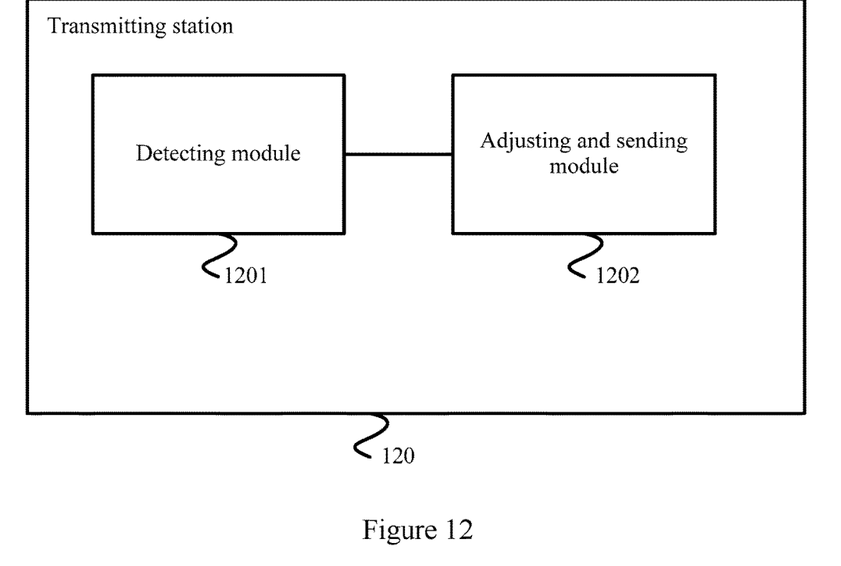
FIG. 12 is a structural diagram of a transmitting station according to an embodiment of the invention.

FIG. 12 is a structural diagram of a transmitting station according to an embodiment of the invention. As illustrated in FIG. 12, the transmitting station 120 according to the embodiment includes a detecting module 1201 and an adjusting and sending module 1202.

The detecting module 1201 is configured to detect a busy/free state of a channel before sending data.

The adjusting and sending module 1202 is configured to increase a maximum duration of occupancy of the channel and send the data in a case that the detecting module detects that the channel is in a free state, where a duration of occupancy of the channel for sending the data is shorter than or equal to the increased adjusted maximum duration.

The adjusting and sending module 1202 is further configured to reduce the maximum duration of occupancy of the channel and send the data in a case that the detecting module detects that the channel is in a busy state, where the duration of occupancy of the channel for sending the data is shorter than or equal to the reduced adjusted maximum duration.

Optionally, the detecting module 1201 is configured to: detect whether the channel is continuously free within a predetermined duration;

determine the channel is in a free state in a case that the channel is continuously free within the predetermined duration; and determine the channel is in a busy state in a case that the channel is not continuously free within the predetermined duration.

Optionally, the detecting module 1201 is further configured to: detect whether the channel is continuously free within a predetermined duration and whether the channel is continuously free in a back-off process;

determine the channel is in a free state in a case that the channel is continuously free within the predetermined duration and the channel is continuously free in the back-off process; and determine the channel is in a busy state in a case that the channel is not continuously free within the predetermined duration or the channel is not continuously free in the back-off process.

Optionally, in a case that the detecting module 1201 detects that the channel is in a busy state, the adjusting and sending module 1202 is further configured to: reduce the maximum duration of occupancy of the channel based on an interference parameter of the busy state of the channel, where the interference parameter includes at least one of the following parameters:

an interference duration, the number of times of interference, an interference frequency and an interference source type.

Optionally, the increased adjusted maximum duration is shorter than or equal to a first predetermined duration, and/or the reduced adjusted maximum duration is longer than or equal to a second predetermined duration, where the first predetermined duration is longer than the second predetermined duration.

Optionally, the adjusting and sending module 1202 is further configured to: reserve the channel and send the data through the reserved channel, where a duration of reservation of the channel is shorter than or equal to the adjusted maximum duration.

The transmitting station according to the embodiment may be applied to the technical solutions of the methods for sending information according to the first to the sixth embodiment, and the implementation principles and technical effects are similar, which are not described herein.

Figure 13:
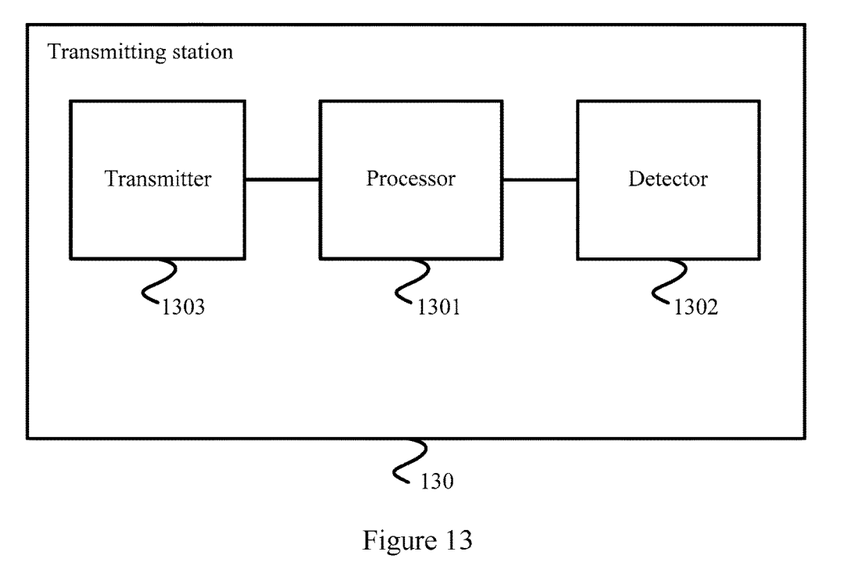
FIG. 13 is a structural diagram of a transmitting station according to another embodiment of the invention.

FIG. 13 is a structural diagram of a transmitting station according to another embodiment of the invention. As illustrated in FIG. 13, the transmitting station 130 according to the embodiment includes a processor 1301, a detector 1302 and a transmitter 1303. The transmitter 1303 may be connected to the processor 1301, and the detector 1302 may be connected to the processor 1301. The detector 1302 is configured to detect a busy/free state of a channel before sending data; the processor 1301 is configured to increase a maximum duration of occupancy of the channel and notify the transmitter 1303 to send the data in a case that the detector 1302 detects that the channel is in a free state, where a duration of occupancy of the channel for sending the data is shorter than or equal to the increased adjusted maximum duration; and the processor 1301 is further configured to reduce the maximum duration of occupancy of the channel and notify the transmitter 1303 to send the data in a case that the detector 1302 detects that the channel is in a busy state, where the duration of occupancy of the channel for sending the data is shorter than or equal to the reduced adjusted maximum duration.

The transmitting station according to the embodiment may be configured to implement the technical solutions of the methods for sending information which are performed by the transmitting station according to the embodiments above, and the implementation principles and technical effects are similar, which are not described herein.

Those in the art shall understand that a part or all of the steps according to the method embodiments can be performed by hardware relating to instructions of a program. The program may be stored in a computer readable storage medium. The program is executed to perform the steps according to the method embodiments above, and the storage medium may include any medium which can store program codes, such as a ROM, a RAM, a magnetic disk or an optical disk.

At last it should be noted that the embodiments above are only used to illustrate, rather than limit, the technical solutions of the invention. Although the invention is described in detail with the embodiments above, those in the art shall understand: alternations may be made to the technical solutions according to the embodiments above, or equivalent substitutions may be made to a part of the technical features thereof; and the alternations or substitutions does not make the essence of corresponding technical solutions deviate from the spirit and scope of the technical solutions according to the embodiments of the invention.

What is claimed is:

1. A method for sending information comprising:
   detecting, by a transmitting station, whether a channel is consecutively free within a predetermined duration and whether the channel is consecutively free in a random back-off process before sending data, wherein the predetermined duration is a distributed coordination function interframe space (DIFS), and wherein the random back-off comprises a back-off counter that counts backward to zero;

increasing, by the transmitting station, a maximum duration of occupancy of the channel if the channel is consecutively free within the predetermined duration and the random back-off process, wherein a duration of occupancy of the channel for sending the data is shorter than or equal to the increased maximum duration;

reducing, by the transmitting station, the maximum duration of occupancy of the channel if the channel is not consecutively free within the predetermined duration or the random back-off process, wherein the duration of occupancy of the channel for sending the data is shorter than or equal to the reduced maximum duration, and wherein reducing the maximum duration of occupancy of the channel is based on an interference parameter of the channel, wherein the interference parameter comprises at least one of: an interference duration, number of times of interference, an interference frequency and an interference source type; and sending, by the transmitting station, the data via the channel.

2. The method according to claim 1, wherein the increased maximum duration is shorter than or equal to a first predetermined duration.

3. The method according to claim 1, wherein the reduced maximum duration is longer than or equal to a second predetermined duration.

4. The method according to claim 1, wherein the increased maximum duration is shorter than or equal to a first predetermined duration, the reduced maximum duration is longer than or equal to a second predetermined duration, and the first predetermined duration is longer than the second predetermined duration.

5. The method according to claim 1, wherein sending the data comprises:

reserving, by the transmitting station, the channel; and sending, by the transmitting station, the data through the channel, wherein a duration of reservation of the channel is shorter than or equal to the increased or reduced maximum duration.

6. A transmitting station comprising:

a processor;

a non-transitory computer readable medium storing instructions thereon such that when the instructions are executed by the processor, the processor is configured to:

determine whether a channel is consecutively free within a predetermined duration and whether the channel is consecutively free in a random back-off process before sending data, wherein the predetermined duration is a distributed coordination function interframe space (DIFS), and wherein the random back-off comprises a back-off counter that counts backward to zero;

increase a maximum duration of occupancy of the channel if the channel is consecutively free within the predetermined duration and the random back-off process, wherein a duration of occupancy of the channel for sending the data is shorter than or equal to the increased maximum duration;

reduce the maximum duration of occupancy of the channel if the channel is not consecutively free within the predetermined duration or the random back-off process, wherein the duration of occupancy of the channel for sending the data is shorter than or equal to the reduced maximum duration, and wherein reducing the maximum duration of occupancy of the channel is based on an interference parameter of the channel, wherein the interference parameter comprises at least one of: an interference duration, number of times of interference, an interference frequency and an interference source type; and a transmitter configured to cooperate with the processor to send the data via the channel.

7. The transmitting station according to claim 6, wherein the increased maximum duration is shorter than or equal to a first predetermined duration.

8. The transmitting station according to claim 6, wherein the reduced maximum duration is longer than or equal to a second predetermined duration.

9. The transmitting station according to claim 6, wherein the increased maximum duration is shorter than or equal to a first predetermined duration, the reduced maximum duration is longer than or equal to a second predetermined duration, and the first predetermined duration is longer than the second predetermined duration.

10. The transmitting station according to claim 6, wherein the transmitter is configured to: reserve the channel and send the data through the channel, wherein a duration of reservation of the channel is shorter than or equal to the increased or reduced maximum duration.

11. A non-transitory, computer-readable medium including executable instructions that, when executed by a processor, provide at least the following operations for sending information:

detecting whether a channel is consecutively free within a predetermined duration and whether the channel is consecutively free in a random back-off process before sending data, wherein the predetermined duration is a distributed coordination function interframe space (DIFS), and wherein the random back-off comprises a back-off counter that counts backward to zero;

increasing a maximum duration of occupancy of the channel if the channel is consecutively free within the predetermined duration and the random back-off process, wherein a duration of occupancy of the channel for sending the data is shorter than or equal to the increased maximum duration;

reducing the maximum duration of occupancy of the channel if the channel is not consecutively free within the predetermined duration or the random back-off process, wherein the duration of occupancy of the channel for sending the data is shorter than or equal to the reduced maximum duration, and wherein reducing the maximum duration of occupancy of the channel is based on an interference parameter of the channel, wherein the interference parameter comprises at least one of: an interference duration, number of times of interference, an interference frequency and an interference source type; and sending the data via the channel.

12. The non-transitory, computer-readable medium according to claim 11, wherein the increased maximum duration is shorter than or equal to a first predetermined duration.

13. The non-transitory, computer-readable medium according to claim 11, wherein the reduced maximum duration is longer than or equal to a second predetermined duration.

14. The non-transitory, computer-readable medium according to claim 11, wherein the increased maximum duration is shorter than or equal to a first predetermined duration, the reduced maximum duration is longer than or equal to a second predetermined duration, and the first predetermined duration is longer than the second predetermined duration.

15. The non-transitory, computer-readable medium according to claim 11, wherein sending the data comprises:
   reserving the channel; and
   sending the data through the channel, wherein a duration of reservation of the channel is shorter than or equal to the increased or reduced maximum duration.

* * * * *